United States Patent
Oppliger et al.

(10) Patent No.: US 8,529,133 B2
(45) Date of Patent: Sep. 10, 2013

(54) PIVOT BEARING

(75) Inventors: Jean-Claude Oppliger, Niederhasli (CH); Michael Landolt, Oftringen (CH)

(73) Assignee: Mueller Martini Holding AG, Hergiswil (CH)

( * ) Notice: Subject to any disclaimer, the term of this patent is extended or adjusted under 35 U.S.C. 154(b) by 18 days.

(21) Appl. No.: 13/348,403

(22) Filed: Jan. 11, 2012

(65) Prior Publication Data

US 2012/0151741 A1 Jun. 21, 2012

Related U.S. Application Data

(63) Continuation of application No. PCT/CH2011/000115, filed on May 18, 2011.

(30) Foreign Application Priority Data

May 26, 2010 (CH) ........................................ 826/10

(51) Int. Cl.
*F16C 23/04* (2006.01)
*F16C 23/08* (2006.01)

(52) U.S. Cl.
USPC .......................................... 384/192; 384/208

(58) Field of Classification Search
USPC ................ 384/192, 203, 206, 208, 209, 210, 384/247, 495, 499; 403/292, 298; 24/458
See application file for complete search history.

(56) References Cited

U.S. PATENT DOCUMENTS

| 857,788 A | * | 6/1907 | Buxton ........................ 384/247 |
| 2,114,051 A | * | 4/1938 | Freed ........................... 384/203 |
| 4,294,345 A | | 10/1981 | Stauber et al. |
| 2005/0023113 A1 | | 2/2005 | Karnes |

FOREIGN PATENT DOCUMENTS

| DE | 202005005829 U1 | 6/2005 |
| EP | 1 832 532 A2 | 9/2007 |
| GB | 1107880 A | 3/1968 |
| WO | WO-03/106851 A1 | 12/2003 |

OTHER PUBLICATIONS

International Search Report of PCT/CH2011/000115 Dated Jun. 26, 2011 Including an English Translation.

* cited by examiner

*Primary Examiner* — Thomas R Hannon
*Assistant Examiner* — Yamilka Pinero Medina
(74) *Attorney, Agent, or Firm* — Venable LLP; Robert Kinberg

(57) ABSTRACT

A pivot bearing includes a spherical bearing body and a single-piece bearing shell. The bearing shell encloses the bearing body at least partially and creates a clearance fit between the bearing body and the bearing shell which clearance fit permits a degree of articulated freedom of the pivot bearing. The single-piece bearing shell includes a radial slot based on a wall thickness of the bearing shell and has at least one contoured bulge. At least one push-in element has a part shape corresponding to the bulge such that the part shape of the push-in element has a defined oversize with respect to the bulge of the slot. The oversize indicates a predetermined clearance fit between the bearing body and the bearing shell that defines a bearing play when the push-in element is mounted in the slot.

8 Claims, 7 Drawing Sheets

Fig. 3
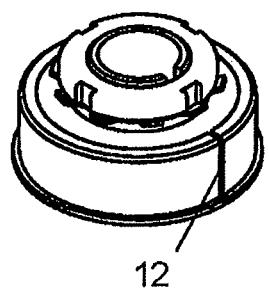
a)
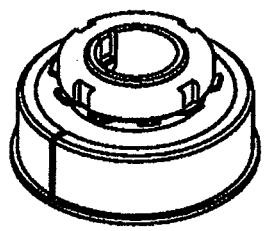
b)
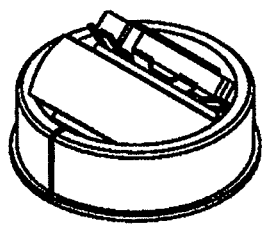
c)
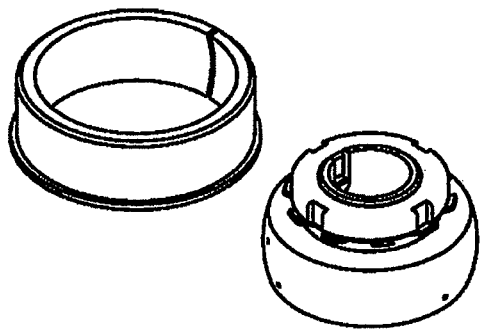
d)

PIVOT BEARING

CROSS-REFERENCE TO RELATED APPLICATIONS

This application is a continuation of International Application PCT/CH2011/000115, filed May 18, 2011, designating the United States and claiming priority from Swiss Application No. CH 00826/10, filed May 26, 2010, the contents of both applications being incorporated herein by reference in their entireties.

TECHNICAL FIELD

The present invention relates to a pivot bearing including a spherical bearing body and a bearing shell wherein the bearing shell encloses the bearing body at least partially and creates a clearance fit between the bearing body and the bearing shell which clearance fit permits a degree of articulated freedom of the pivot bearing. The application also relates to a method for producing such a pivot bearing. Furthermore, the invention relates to the application and use of the pivot bearing in conjunction with the formation of a conveyor chain which comprises chain links.

PRIOR ART

Pivot bearings form an essential component in flexible couplings of dynamically operating elements. As an example of this, the coupling of chain links is to be mentioned, which chain links are joined together to form a conveyor chain. If, in particular, conveyor chains of this type are to be guided over undulating or direction changing tracks, these pivot bearings are accorded important operational significance.

European patent document EP 1 832 532 A2 discloses a conveyor chain, the chain links of which are coupled to one another via pivot bearings. In so far as it relates to the pivot bearing, this prior art is specified by the fact that this pivot bearing comprises a spherical bearing body which is operatively connected to a bearing housing.

In the case of this restriction, the teaching which is apparent from this document is substantially to be developed by the bearing housing comprising two bearing housing parts, each bearing housing part having a flange part. The flange parts of the bearing housing parts and the bearing ends of the plates are held together with the aid of a common fixing device, in such a way that the bearing housing parts enclose the bearing body fixedly solely as a result of the fixing device, and the bearing housing parts are fastened in the bearing ends of the plates in a manner which is secured against rotation and axial displacement, and the bearing ends of the plates are fixed relative to one another.

Furthermore, it is apparent from this document that the two-piece bearing housing encloses the spherical bearing body, and that the two bearing housing parts are assembled non-positively via what are known as fixing means.

Furthermore, it is explained in this document that the fixing means has holes in the region of the dividing plane of the two bearing housing parts, which holes are operatively connected to pins which are mounted in an opposed manner and via which the centering of the spherical bearing body is produced. Accordingly, the spherical bearing body is trapped by two bearing housing parts, the latter then being oriented with respect to the spherical bearing body by the centering elements and then being anchored non-positively.

In an installation of this type, however, it has to be ensured that the spherical bearing body can fulfill its innate articulated function, whereby it has to be kept in mind, in particular, during the assembly of a pivot bearing of this type that a corresponding bearing play is ensured if the intended use of this pivot bearing is to be ensured.

In a pivot bearing which is constructed in this way, it is to be taken into consideration that extremely small tolerances have to be maintained in relation to the spherical bearing body, in particular during the production of the bearing housing parts and during their determined centering with respect to one another if the functionality of the pivot bearing is to remain ensured in every position which is produced during operation, in particular if the pivot bearings are used in conveyor chains.

A further accuracy which is not to be underestimated during the production of the pivot bearing relates to the formation of the two inner bearing shell shapes which have to correspond exactly with the spherical shape of the bearing body. In a construction of this type, the question remains unsettled as to which means the system can provide here for setting the bearing play.

Great Britain patent document GB 1,107,880 A1 discloses a pivot bearing which also substantially comprises a bearing body in the form of a spherical part ball and a bearing housing. In this pivot bearing, a preceding dimensional adaptation of the bearing housing (outer ring blank 1) is performed with respect to the inner spherical bearing body, in order to satisfy the operating conditions of a pivot bearing of this type. For this purpose, this bearing shell is firstly brought into operative connection with the bearing body, and is secondly delimited by an outer ring, in which the bearing shell is then trapped radially. The setting of the play between the bearing shell and the bearing body is achieved by the fact that the bearing shell, that is to say the "outer ring blank", is compressed axially on both sides until the spacing between the circumference of the bearing body and the inner face of the outer ring is bridged by a non-positive connection which is exerted by the expanding bearing shell.

After this first operation, the pivot bearing, that is to say the bearing shell and the bearing body, is then removed from the outer ring and is transferred into an apparatus with a larger hole, the size of which then permits the operationally necessary plays between the bearing shell and the bearing body. The bearing shell is then to be modified by mechanical interventions in such a way that it is set to the new hole. The material of the bearing shell should be satisfactorily deformable and have satisfactory sliding properties.

According to the description, the bearing play between the bearing body and the bearing shell is brought about in such a way that a deformation is exerted in a cutout of the bearing shell by a wedge, which deformation is to indicate the bearing play. However, it is not apparent from this document how effectively a reproducible strictly delimited clearance fit can be achieved between the bearing body and the bearing shell. In this document, it is merely stated that, by driving a wedge within a cutout in the bearing shell, clearly that clearance fit is to be achieved which has to be the basis for the operation of the pivot bearing. This document neither discloses nor renders obvious which intended benchmarks and/or basis are/is to be provided or actuated here during the production of this clearance fit. In addition, the use of a wedge for producing a play is very highly problematic. Moreover, the document leaves much unclear with respect to the production of the clearance fit, with the result that a person skilled in the art is not provided with any clear teaching with respect to the technical activity. In particular, it is also not apparent from the document how the mechanical external factors and the imponderables are to be made up for during assembly.

SUMMARY OF THE INVENTION

The invention is based on an object of a long term increase in functionality both during the production and during operation in the case of a pivot bearing of the type which is mentioned in the introduction, which pivot bearing substantially comprises a ball-shaped (spherical) bearing body and a bearing shell.

The above and other objects are achieved according to the invention by the provision of a pivot bearing, that in one embodiment comprises: a spherical bearing body; a single-piece bearing shell, the bearing shell enclosing the bearing body at least partially and creating a clearance fit between the bearing body and the bearing shell which clearance fit permits a degree of articulated freedom of the pivot bearing, the single-piece bearing shell including a radial slot based on a wall thickness of the bearing shell and having at least one contoured bulge; and at least one push-in element having a part shape corresponding to the bulge such that the part shape of the push-in element has a defined oversize with respect to the bulge of the slot, which oversize indicates a predetermined clearance fit between the bearing body and the bearing shell that defines a bearing play when the push-in element is mounted in the slot.

According to another aspect of the invention, there is provided method for producing a pivot bearing, that in one embodiment comprises: casting a single-piece bearing shell around a bearing body so that a positively locking connection is produced between the bearing body and the bearing shell.

According to the invention, the spherical bearing body forms one basis for providing a one-piece pivot bearing. The other basis is formed by the fact that this bearing body is enclosed substantially in the region of its spherical outer face by a bearing shell by means of a casting process. The spherical bearing body is therefore first of all trapped fully in this single-piece bearing shell, the axial covering of the bearing body by the bearing shell ensuring that the spherical part of the bearing body also remains trapped positively in the axial direction.

In this production using casting technology, it may then be provided that the bearing shell is given a continuous slot through the wall thickness along its radial extent, which slot then later serves, or at any rate can be used, for the reliable setting of an associated bearing play between the spherical bearing body and the surrounding bearing shell.

An advantage of the invention is therefore to be seen in the fact that the bearing shell does not lose its one-piece nature despite the continuous slot, and accordingly is considered to be in one piece, with the result that further non-positively locking elements do not have to be provided in order to form an assembled bearing shell.

A further advantage relates to the setting of the bearing play between the spherical bearing body and the encompassing one-piece bearing shell.

In principle, the casting operation can be set up in such a way that an original bearing play is provided between the spherical bearing body and the surrounding bearing shell, that is to say subsequent setting of the bearing play can be dispensed with completely. Even if the production of the bearing shell is provided with a slot, the latter therefore does not necessarily have to be used to set the bearing play. This is the case, for example, when the bearing shell has an operationally necessary ring pushed over it.

If, however, the targeted setting of a bearing play is to be operationally necessary in special operational uses of the pivot bearing, the casting operation is designed in such a way that a non-positive locating fit results between the bearing body and the bearing shell. Accordingly, recourse is made to the slot in the bearing shell, by a dimensionally narrowly defined push-in element being pushed into the slot, which push-in element brings about fixed spreading of the bearing shell in the region of the slot, which spreading is a function of the bearing play. At the same time, the push-in element also brings about physical integral bridging of the slot, whereby the pivot bearing has an outer defined contour.

A further advantage of the invention is to be seen in the fact that the pivot bearing according to the invention makes optimization of the materials possible between the spherical bearing body and the surrounding bearing shell, taking into account the fact that subsequent machining of the elements of a pivot bearing of this type are dispensed with completely.

Furthermore, reference is made to an option according to the invention, by which targeted individual setting of the bearing play between the bearing body and the bearing shell can be performed in extreme operating conditions, by correspondingly dimensioned push-in elements pushed in through the abovementioned slot, so that the spreading of the bearing shell and therefore the securing of the bearing play of the spherical bearing body can also at any rate be performed in any situation.

The push-in elements can be pushed into the slot radially or else axially. In every case, the push-in element has a shape which can be pushed readily into a corresponding mating shape of the bearing shell in the region of the slot, in such a way that this leads to a positive and non-positive connection of the two parts which additionally ensures the one-piece nature of the bearing shell.

It is therefore also ensured that exclusively a single bearing play can be produced which has only a predefined clearance fit. Here, the push-in parts are provided such that they are tangent on neither the spherical inner face of the bearing shell nor the bearing body itself. Furthermore, it can be provided that the push-in element also comprises two congruent parts which can be pushed into the slot in a diametrically opposed manner, which leads to a quality-ensuring dimensional stability of the bearing shell, in particular if they are pushed in in an axial, diametrically opposed manner.

Accordingly, the push-in element has a lower-side narrow lip which is intended for the slot of the bearing shell, and an upper widened portion, the shape of which corresponds to the mating shape which is provided in the upper part of the bearing shell. Accordingly, the geometric shape of the push-in element is may be designed in such a way that this element comprises on the upper side an approximately semicircular to circular pin-like shape, and on the underside has a substantially rectangular lip, corresponding to the width of the slot in the bearing shell. The upper part of the push-in element can readily have a different geometric shape, that is to say can be configured to be approximately trapezoidal instead of circular. It goes without saying that the respective mating shape in the bearing shell then has to be configured correspondingly.

In the following text, one exemplary embodiment of the invention will be explained in greater detail using the drawings. All the features which are not essential for directly understanding the invention have been omitted. Identical elements are provided in the different figures with the identical designations.

BRIEF DESCRIPTION OF THE FIGURES

In the drawing:

FIGS. 3a-d show different views of the pivot bearing.

DETAILED DESCRIPTION

Figure 1:
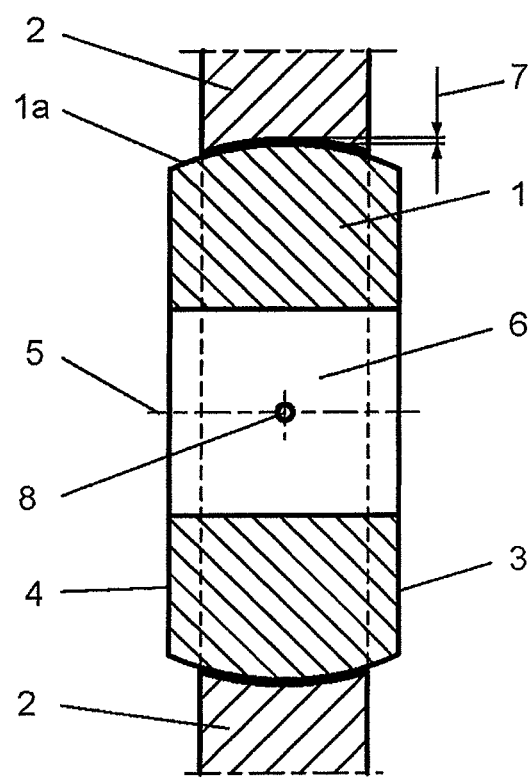
FIG. 1 shows a pivot bearing comprising a spherical bearing body and a bearing shell.

An articulated connection between two chain links of a conveyor chain is generally produced by a pivot bearing, as is apparent diagrammatically from FIG. 1 (see also FIGS. 3a-d). The pivot bearing which is shown here and up to now has also been called a spherical ball and socket bearing substantially comprises a spherical bearing body 1 and a spherical shell segment 2 (also called a bearing shell for short), the two elements 1, 2 being in strict operative connection with one another. Accordingly, the spherical bearing body 1 has a spherical part surface 1a which extends over the entire width of the bearing body 1. The bearing body 1 has a piercing hole 6 which serves to couple elements (not shown here in greater detail) which then behave in an articulated manner, according to the degree of spherical freedom of the bearing body 1. The bearing body 1 is delimited axially between two end sides 3, 4 which lie opposite one another, the end sides 3, 4 being at right angles or quasi right angles to the axis 5 of the bearing body 1. The bearing play 7 is shown in FIG. 1 on a greatly enlarged scale. In practice, this bearing play will move within the tolerance limits of a sliding fit. The installed articulated elements exert radial or quasi radial forces on the bearing shell 2 during operation, which forces are oriented at the geometric center point 8 of the spherical bearing body 1 in the ideal case. It is then to be taken into consideration per se that the bearing play 7 can experience deformations as a result of the intensity of said forces, with the result that the original presetting or setting of this bearing play 7 has to be taken into consideration accordingly.

The materials of the bearing body 1 and the bearing shell 2 form a substantial basis for the determination of the bearing play 7. According to current findings, plastic materials can be provided which ensure a certain elasticity with respect to the deformation which is caused by the intensity of the forces which occur during operation, without it therefore being necessary to dispense with low coefficients of sliding friction. The bearing body 1 can have the bearing shell 2 cast around it by way of various production processes using casting technology; for example, this can be brought about by a die casting process.

Figure 2:
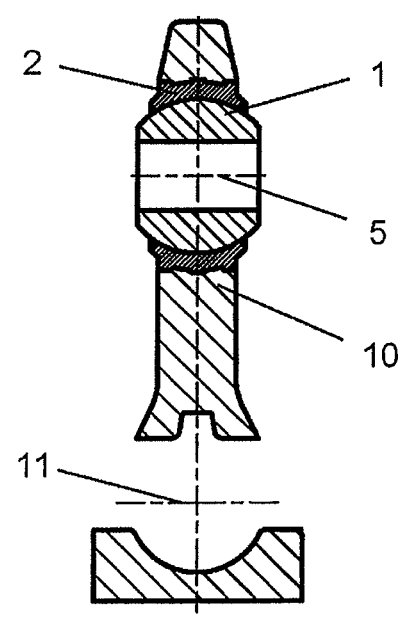
FIG. 2 shows the pivot bearing according to FIG. 1 in the installed state.

FIG. 2 shows the spherical ball and socket bearing in the installed state. In this illustration, the bearing body 1 and the bearing shell 2 penetrate the plug-in region 10. The plug-in region 10 is mounted rotatably on the bearing shell 2 via the bearing body 1, with the result that a first chain link of a conveyor chain is mounted pivotably with regard to the axis 5 with the plug-in region 10, in relation to the receiving region 11 of a second chain link. A spherical oscillating movement of the plug-in region 10 with respect to the bearing body 1 is also possible per se in a construction of this type; in particular, this has an advantageous effect when forces of further elements act on the bearing body 1, which take effect outside the axis 5. The behavior of an oscillating movement of this type in comparison to the bearing body and the bearing shell is apparent, for example, from FIG. 3c.

FIGS. 3a-c show different views of the installed spherical ball and socket bearing. In particular, the spherical configuration of the bearing body 1 and its spherical pivotability with respect to the bearing shell 2 can be seen from FIG. 3c. This pivotability permits the oscillating movement which has already been described above. The slotted bearing shell 12 can be readily seen in all of FIGS. 3a-d. On the upper side, the slot 12 preferably has an intermediate round plug-in shape, into which the mutually shaped push-in element (not shown in greater detail) can be pushed laterally, whereby strictly defined spreading of the bearing shell 2 is achieved. Once the push-in element has been pushed in, a non-positive and positive connection is thus produced with respect to the bearing shell 2. In order to avoid unnecessary repetitions, reference is made in relation to push-in elements to the comments in the third last paragraph under the heading "Summary of the Invention". Furthermore, the bearing body and the bearing shell can be seen in an uninstalled state in FIG. 3d.

Figure 4:
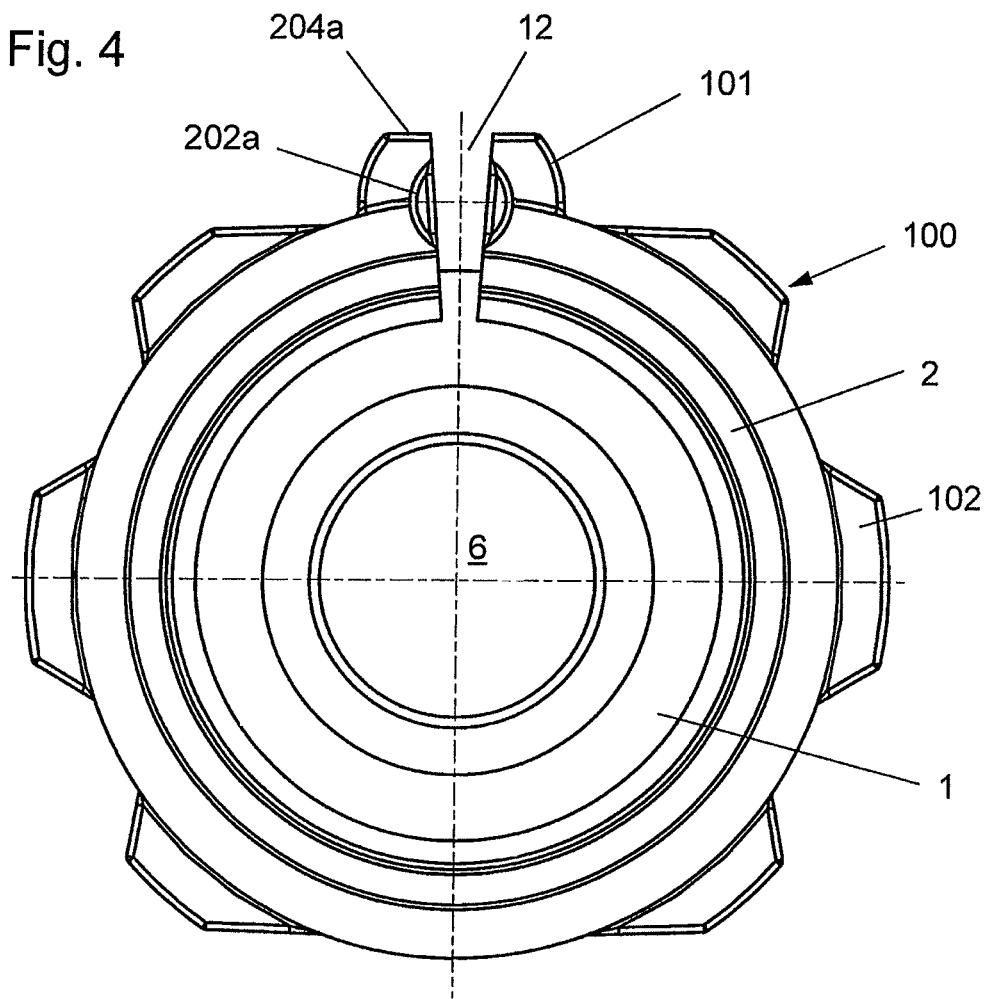
FIG. 4 shows a pivot bearing, without an installed push-in element.

FIG. 4 shows a detailed view of FIG. 3a. This is therefore an installed state between the bearing body 1 and the bearing shell 2. Distributed on the circumference, the spherical ball and socket bearing 100 has a number of projecting ribs 102 which form the anchoring in the installed state according to FIG. 2. Furthermore, the bearing shell 2 has a radially projecting lug 101 with an upper side terminating face 204a, in which the radial slot 12 is situated and passes through the wall thickness. The radial slot 12 extends slightly conically from top to bottom and, moreover, has a bulge 202a of largely round cross section. The bulge is preferably guided through the entire width of the bearing shell 2. It goes without saying that this bulge 202a does not necessarily have to have the round contour shown here. Other geometric contours are also possible. Since, as intended, they have to correspond geometrically with the part shape of the push-in element (see FIG. 6), a contour which is easy to push in will be selected, as is proposed in FIG. 4. The upper side terminating face 204a serves to terminate with the mating face of the push-in element in the installed state. To this end, reference is made to FIGS. 6-8.

Figure 5:
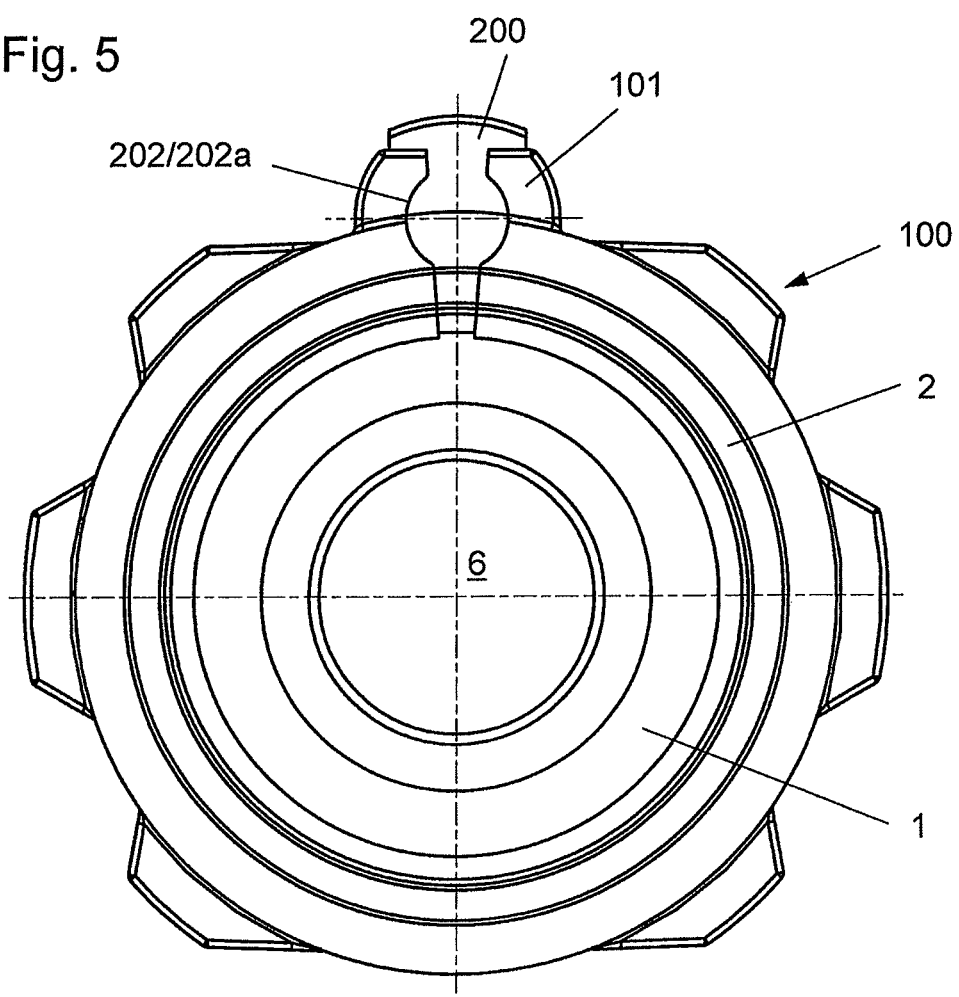
FIG. 5 shows a pivot bearing with an installed push-in element.

The spherical ball and socket bearing 100 which is ready for use and in which the push-in element 200 has then been attached is apparent from FIG. 5. Accordingly, the interdependence between the cross-sectional shapes of the slot 12 and the outer shape of the push-in element is apparent from FIG. 5. Here, the non-positive connection is formed by the initial undersize of the circular bulge 202 of the slot 12 with respect to the corresponding outer shape 202 of the push-in element 200. As viewed in three dimensions, the circular bulge 202 forms a pin-shaped round shape. The oversize of the corresponding outer shape 202 of the push-in element 200 ensures that this causes minimum spreading of the bearing shell in the installed state in the slot 12, which spreading has an effect on the initial non-positive connection of the bearing body 1, in such a way that the clearance fit with respect to the bearing shell 2 is the consequence.

This clearance fit which is realized by spreading can be defined very accurately in advance on account of the production process of the spherical ball and socket bearing, and applies equally to a complete production of spherical ball and socket bearings. The remaining cross-sectional profile between the slot 12 and the push-in element 200 above and below the non-positive contours have sliding tolerances, and serve mainly to seal the bearing body 1 against contamination.

Figure 6:
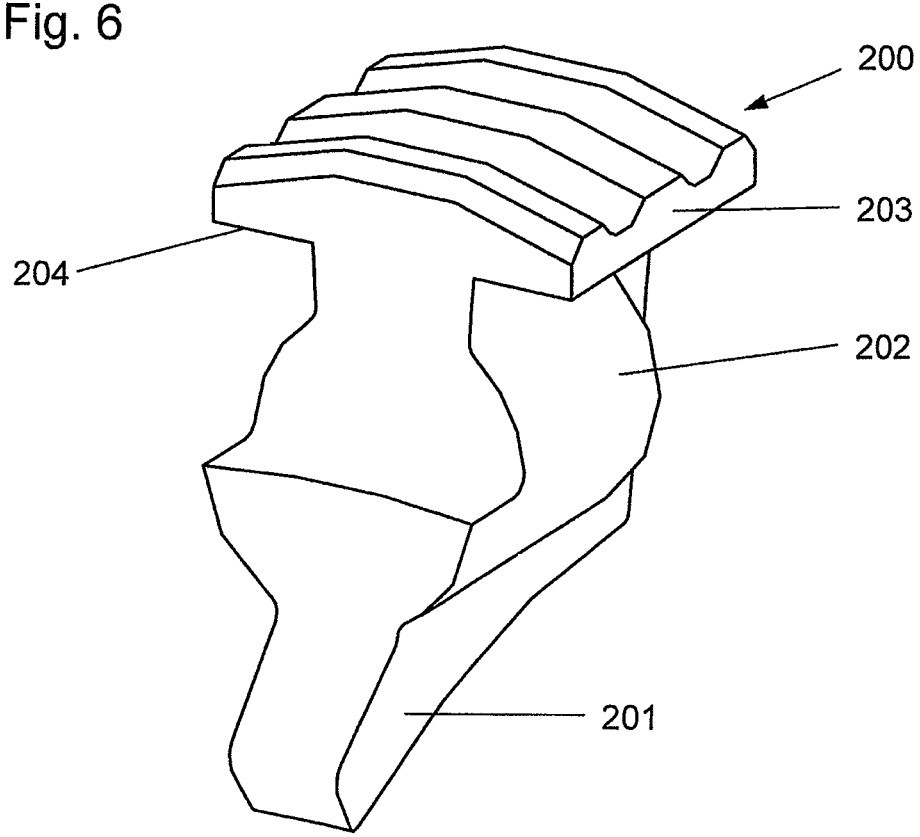
FIG. 6 shows a push-in element in a three-dimensional illustration.

FIG. 6 shows the push-in element 200 in a three-dimensional illustration. The outer shape of the push-in element is defined according to the cross section of the slot according to FIGS. 4 and 5. On the underside, the push-in element 200 has a narrow substantially rectangular lip 201 which is intended as the termination with respect to the bearing body 1 for the underside bearing body-side slot 12 of the bearing shell 2. On the upper side, the push-in element 200 has a widened portion 203, the underside 204 of which forms the mating face to the upper side terminating face 204*a* of the projecting lug 101 (see FIGS. 4 and 5). Furthermore, the round contour of the part shape 202 of the push-in element 200 can be seen here, which round contour corresponds to the mating shape 202*a* in the slot 12 (see FIG. 5). On the upper side, the widened portion 203 has a corrugated surface which serves for facilitated installation and dismantling of the push-in element 200. Accordingly, the geometric outer shape of the push-in element 200 is preferably constructed in such a way that it firstly corresponds fully with the cross-sectional shape of the slot along the entire wall thickness of the bearing shell 2, with the proviso that the round part shape 202 brings about minimum spreading of the bearing shell 2 during the mounting of the push-in element 200 as a result of its oversize in relation to the bulge 202*a* of the slot 12, which spreading is causally representative of the clearance fit between the bearing body 1 and the bearing shell 2. It goes without saying that other cross-sectional shapes of the slot 12 can also be provided, ensuring congruent contours of the slot 12 with respect to the outer shape of the push-in element 200 remaining essential. This applies strictly geometrically apart from those fits which form the basis for the clearance fit between the bearing body and the bearing shell. As has already been dealt with in detail above, a dimensional difference is provided here in the rest state of the bearing shell 2 with respect to the push-in element 200.

The casting process during the production of the bearing shell 2 with inclusion of the bearing body 1 first of all produces a rigid structure between the two parts, which rigid structure is first of all decoupled by the use of the push-in element 200 in order to achieve the clearance fit, the reproducibility of the casting process being ensured, that is to say that the dimensional measurements of the outer shape of the push-in element 200 remain identical. However, the invention is also distinguished by the fact that the clearance fit can be designed flexibly as a result of corresponding dimensioning of the outer shape of the push-in elements.

Figure 7:
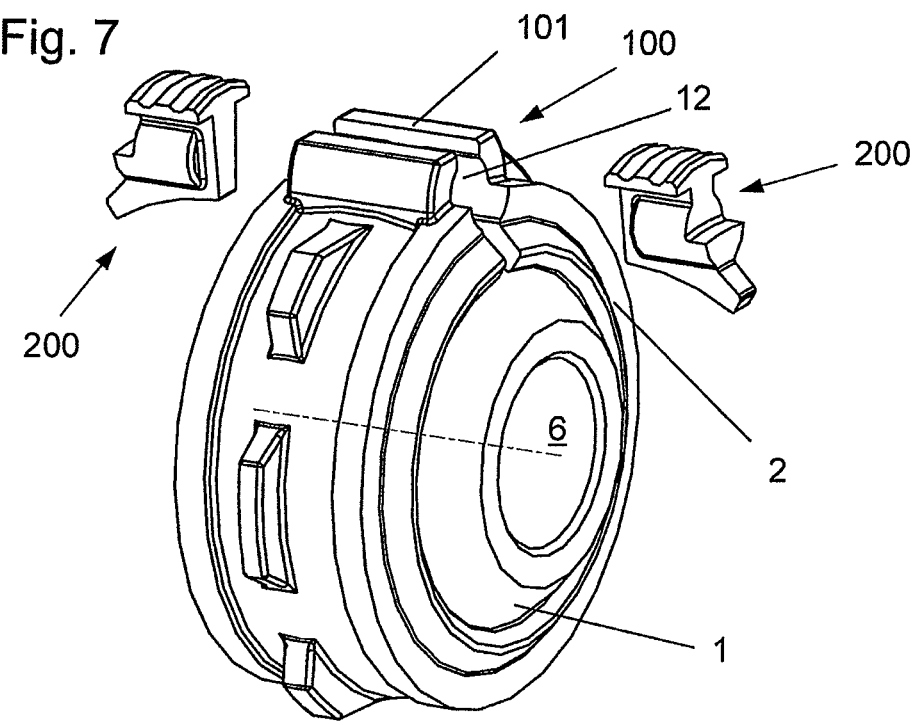
FIG. 7 shows a three-dimensional illustration of the pivot bearing before the mounting of push-in elements which can be pushed in in a mirror inverted manner with respect to one another.

FIG. 7 shows the spherical ball and socket bearing 100 in a three-dimensional illustration which indicates the push-in operations of the push-in element 200. In the present case, two identical push-in elements are provided which are pushed into the slot 12 in a diametrically opposed manner. The pin-shaped fit and the underside shape of the rectangular lip of the push-in element 200 can be seen particularly readily, the underside shape corresponding to the spherical surface of the bearing body 1.

Figure 8:
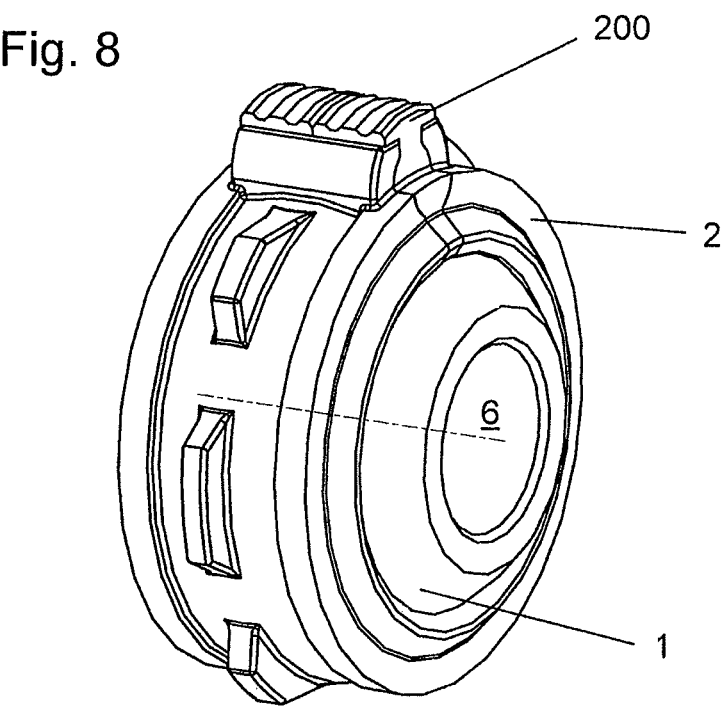
FIG. 8 shows a three-dimensional illustration of the pivot bearing which is completed with the push-in elements.

Finally, FIG. 8 shows the assembled spherical ball and socket bearing.

The invention claimed is:

1. A pivot bearing, comprising:
   a spherical bearing body;
   a single-piece bearing shell, the bearing shell enclosing the bearing body at least partially and creating a clearance fit between the bearing body and the bearing shell which clearance fit permits a degree of articulated freedom of the pivot bearing, the single-piece bearing shell including a radial slot based on a wall thickness of the bearing shell and having at least one contoured bulge; and
   at least one push-in element having a part shape corresponding to the bulge such that the part shape of the push-in element has a defined oversize with respect to the bulge of the slot, which oversize indicates a predetermined clearance fit between the bearing body and the bearing shell that defines a bearing play when the push-in element is mounted in the slot.

2. The pivot bearing as claimed in claim 1, wherein the bearing body has a spherical outer shape.

3. The pivot bearing as claimed in claim 1, wherein the bulge of the radial slot is continuous in the bearing shell and has a round contour arranged intermediately in a radial direction between an outer face and an inner face of the bearing shell.

4. The pivot bearing as claimed in claim 1, wherein the push-in element has an outer shape that has a positive fit with a cross section of the slot.

5. The pivot bearing as claimed in claim 1, wherein the bearing body has a positively locking spherical conformal degree of freedom within the bearing shell.

6. The pivot bearing as claimed in claim 1, wherein the bearing body is permitted to perform an oscillating movement with respect to the axis of the bearing shell within bounds of a spherical degree of freedom.

7. The pivot bearing as claimed in claim 6, wherein a cross section of the slot in the bearing shell is in operative connection with the outer shape of the push-in element which brings about fixing of the bearing shell with respect to the bearing body, which fixing is dependent on the bearing play, and wherein the push-in element is pushible one of radially or axially into the slot, and the push-in element comprises at least one part.

8. The pivot bearing as claimed in claim 7, wherein the fixing of the bearing shell is conditional on the mounted push-in element and produces at least one positively locking connection between the bearing body and the bearing shell, and the positively locking connection produces a maximum clearance fit between the bearing body and the bearing play.

* * * * *